Feb. 1, 1938.   A. N. PASMAN   2,107,126
CONVERTIBLE SINK STRAINER
Filed May 13, 1937
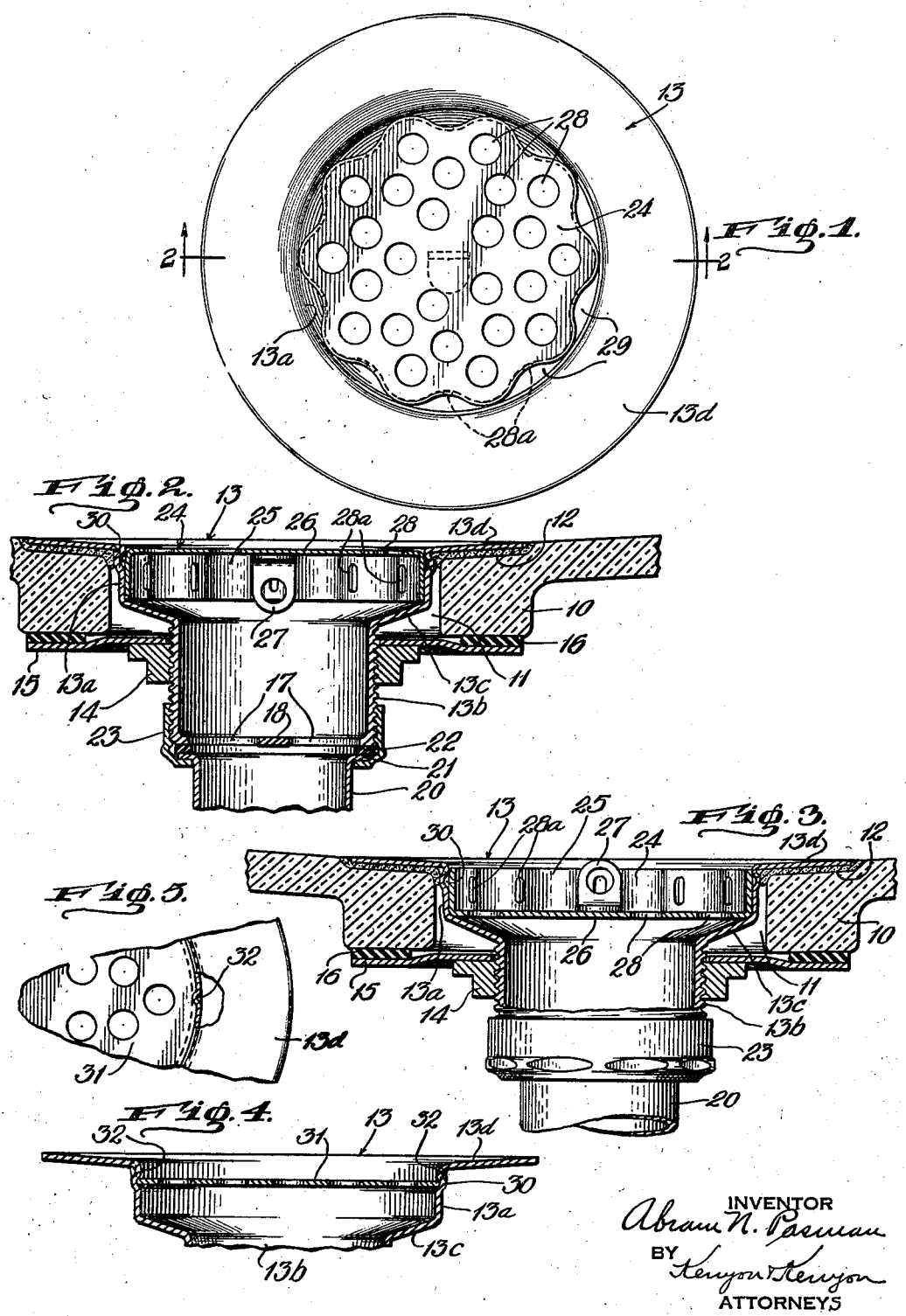
INVENTOR
Abram N. Pasman
BY Kenyon & Kenyon
ATTORNEYS Patented Feb. 1, 1938

2,107,126

UNITED STATES PATENT OFFICE 2,107,126

CONVERTIBLE SINK STRAINER

Abram N. Pasman, Milford, Conn.

Application May 13, 1937, Serial No. 142,327

11 Claims. (Cl. 4—291)

The present invention relates to convertible sink strainers for sinks with large drain openings and to the supporting bodies therefor.

One object of my invention is to provide a supporting body with sufficient body depth to accommodate a cup-or-basket shaped strainer or grid perforated in its bottom and capable of being convertibly inserted into the said supporting body so that in one position it will serve as an ordinary flat strainer, and in the other position as a strainer and also as a basket for collecting large particles of refuse or waste material which ordinarily will not pass through its perforations.

Another object of this invention is to so construct the strainer as to be easily and conveniently placed in either of its two positions and removed from its supporting body.

A still further object of my invention is to provide a strainer construction which, when the strainer is in use, will permit drainage through passages between the walls of the supporting body and the strainer as well as through the piercings or perforations.

Still another object is to so construct the supporting body as to allow free and ample draining below the strainer and whereby any clogging accumulation below the strainer is avoided.

Still another object is to provide a supporting body construction which, upon the removal of the cup-shaped strainer, will permit the ready and convenient placement in said supporting body of a flat grid or strainer disc as a substitute for said cup or basket strainer without requiring any change in construction or the use of any extra parts.

With these and other objects in view my invention consists in the novel construction, combination and arrangement of elements to be hereinafter more fully described, shown and defined in the appended claims.

In the drawing in which similar reference characters denote corresponding parts:—

Figure 1 is a top plan view of a device made according to my invention;

Figure 2 represents a vertical section taken along line 2—2 of Figure 1 showing the device in position in the drain opening of a sink, the perforated cup or basket-shaped strainer being shown in inverted position to present a flat straining surface;

Figure 3 represents a view similar to that shown in Figure 2 with the strainer in reversed position for use as a basket to collect larger particles of waste materials which do not pass through its perforations;

Figure 4 is a fragmentary reduced vertical section of the strainer supporting body with the cup or basket-shaped strainer removed and a disc grid or strainer substituted therefor; and Figure 5 is a fragmentary top plan view of the device of Figure 4, broken away in part to illustrate a detail of construction.

In the drawing 10 denotes a portion of the wall of the sink or the like which is provided with the drain opening 11. The upper face of said wall around said drain opening is provided with an annular cavity or depression 12 whose bottom slopes toward the said opening. The device constituting the subject-matter of my invention is adapted to be inserted in said drain opening 11.

The said device comprises a supporting body which in the present embodiment consists of a hollow member 13 whose mouth portion 13a is substantially cylindrical in shape and whose lower portion 13b is tubular and externally threaded constituting the shank of said member. The said shank is somewhat smaller in diameter than the said mouth portion 13a and there is a downwardly sloping or conical portion 13c intermediate said mouth and shank portions. The upper end of the mouth portion is formed with an annular upwardly sloping flange 13d which, when the supporting member is inserted into the drain opening 11, will extend over the cavity 12 to be sealed therein by cement or other suitable means.

The supporting body is secured in position in the drain opening 11 by a suitable clamping nut 14 which is threaded on the shank 13b and which clamps the washer 15 against a packing ring 16 of rubber or other suitable material which abuts against the under side of the wall of the sink 10 to form a water-tight joint. The bottom of the shank 13b is provided with openings 17 formed by straps 18 or otherwise to serve as an auxiliary strainer and for strength.

A pipe 20 is adapted to be coupled to the lower end of the tubular shank 13b to form an extension thereof. This pipe has a flange 21 which is held against a washer 22 bearing on the rim portion of the bottom of the shank 13b by a coupling or clamping member 23, which threadedly engages the external thread of the shank.

A strainer or perforated grid 24 is adapted to be removably and reversibly mounted in the mouth portion 13a of said supporting member 13. This strainer is cup or basket shaped and has a corrugated, channelled, fluted, ribbed or otherwise suitably shaped circumferential wall 25, preferably a flat bottom 26, and a suitable lifting means, as a handle 27, attached thereto to facilitate the positioning and removal of said strainer. Perforations or piercings 28, 28a are provided in the bottom of said strainer and in the circumferential wall 25 respectively, the holes 28a being located in the parts of the circumferential wall 25 which are spaced from the wall of the supporting body. This strainer is adapted to be inserted into the mouth portion 13a and is so admeasured in diameter as to fit in the said mouth portion, and in height to be substantially equal to the height of the circumferential wall of said mouth portion. By making the circumferential wall 25 channelled, corrugated or ribbed, a point, or more correctly, a line contact between the wall of said supporting member 13 and said strainer is afforded, thereby facilitating the removal of the strainer from said member, and preventing sticking or catching on the wall of the supporting body. The corrugations or channels also form passages 29 which permit draining between said member 13 and the strainer as well as through the perforations thereof.

When the strainer 24 is inserted cup-side down its bottom 26 presents a perfectly flat strainer surface at the top of the mouth portion 13a. Draining then occurs through the perforations 28 in the bottom 26 of said strainer as well as the interstices or passages 29 between the circumferential wall 25 of said strainer and circumferential wall of the mouth portion 13a. When the said strainer is reversely mounted in the said mouth portion 13a with its bottom down, in addition to serving as a strainer, it functions as a basket to collect larger waste particles not passing therethrough. After the liquid has been emptied from the sink the strainer may be removed by grasping the handle 27 and the contents thereof emptied.

The circumferential wall of the mouth portion of the supporting body is provided at a point intermediate of its height, with an annular groove or recess 30 for the reception of a flat perforated grid or strainer 31 (Fig. 4) which, if desired, may be substituted for the cup-shaped strainer 24 on removal of the latter. Snap lugs, protuberances, or the like 32 (Fig. 5) may be provided in the wall of said mouth portion 13a above said annular groove 30 to retain said flat strainer 31 in position.

The degree of slope given to the sloping portion 13c of the supporting body is so chosen as to permit free and ample flow of draining fluid from the passages or interstices 29 between the walls of the said supporting body and the strainer 24 and also to prevent clogging accumulation of waste material below the said strainer.

It is, of course, understood that the strainer 24 may be made with a smooth circumferential wall if desired, instead of with the channelled or corrugated wall.

Various other modifications may be made in the construction and shape of my device without departing from the spirit of my invention and I, therefore, do not wish to limit myself to the details shown and described.

What I claim is:

1. A strainer for a sink or the like consisting of a cylindrical cup-shaped body having a flat perforated bottom, a corrugated, perforated circumferential wall, and a handle attached to said bottom for the removal of said strainer from said sink, the perforations in said circumferential wall being located only in the depressed portions of said corrugations.

2. In a device of the character described, a hollow open ended supporting body, and a cup-shaped strainer having a perforated flat bottom adapted to removably fit in said body, said strainer being reversible for use either as an ordinary flat strainer or as a basket to collect waste particles not passing therethrough.

3. In a device of the character described, a hollow open ended supporting body having a mouth portion, a shank of reduced diameter and a sloping portion joining said shank and said mouth portion, a cup-shaped strainer adapted to removably fit in said mouth portion and having a flat perforated bottom and a corrugated circumferential wall bearing on the circumferential wall of said mouth portion, said cup-shaped strainer being reversible for use either as an ordinary flat strainer or as a basket to collect waste materials not passing therethrough.

4. In a device of the character described, a hollow open ended supporting body adapted to be inserted into the drain openings of a sink or the like, said supporting body having a cylindrical mouth portion, and a cup-shaped strainer adapted to be removably borne in said mouth portion, and whose circumferential wall is channelled to form drain passages between itself and the wall of said supporting body, said strainer being reversible for use either as an ordinary strainer or as a basket to collect waste particles not passing therethrough.

5. In a device of the character described, a hollow open ended supporting body having a cylindrical mouth portion, a cup-shaped strainer adapted to be removably borne in said mouth portion and having a perforated flat bottom and a corrugated perforated circumferential wall adapted to bear on the circumferential wall of said mouth portion, said cup-shaped member being reversible in its position to be used either as an ordinary flat strainer or as a basket to collect waste material not passing therethrough.

6. In a device of the character described, a supporting body for a cup-shaped strainer comprising a mouth portion whose depth is substantially equal to the height of said strainer and into which said strainer is adapted to fit, a shank below said mouth portion, a sloping portion between said mouth portion and said shank, and means in said mouth portion for the support of a flat strainer on the removal of said cup-shaped strainer.

7. In a device of the character described, a supporting body for a cup-shaped strainer having a mouth portion whose depth is substantially equal to the height of said strainer and into which said strainer is adapted to fit, a shank and a sloping portion between said mouth portion and said shank, said mouth portion having an annular groove therein for the support of a flat strainer on the removal of said cup-shaped strainer.

8. In a device of the character described, a supporting body for a cup-shaped strainer having a mouth portion, a shank and a sloping portion between said mouth portion and said shank, means for supporting a flat strainer in said mouth portion on the removal of said cup-shaped strainer, and means for securing said flat strainer in position.

9. In a device of the character described, a supporting body for a cup-shaped strainer, said body having a cylindrical mouth portion, a tubular shank and a conical portion between said cylindrical mouth portion and said shank, said mouth portion having an annular groove for supporting a flat strainer on the removal of said cup-shaped strainer and snap lugs for securing said flat strainer in position in said annular groove.

10. In a device as per claim 3, in which the said circumferential wall of said mouth portion, and said circumferential wall of said cup-shaped strainer are substantially equal in height, whereby when said strainer is used as a basket said perforated bottom will bear on said sloping portion and the upper rim of said strainer will lie substantially at the level of the entrance to said mouth portion, and when said strainer is reversed for use as an ordinary flat strainer said bottom will lie substantially at the level of said entrance and said rim will bear on said sloping portion.

11. In a device as per claim 5, in which the said circumferential wall of said mouth portion and said circumferential wall of said cup-shaped strainer are substantially equal in height, whereby when said strainer is used as a basket, said perforated bottom will lie at the bottom of said mouth portion and the upper rim of said strainer will lie substantially at the level of the entrance to said mouth portion, and when said strainer is reversed for use as an ordinary flat strainer, said bottom will lie at the level of said entrance and said rim will lie at the bottom of said mouth portion.

ABRAM N. PASMAN.